United States Patent
Qua et al.

(10) Patent No.: US 6,222,909 B1
(45) Date of Patent: Apr. 24, 2001

(54) AUDIO NOTE TAKING SYSTEM AND METHOD FOR COMMUNICATION DEVICES

(75) Inventors: Gin W. Qua, Piscataway; Edward Stanley Szurkowski, Maplewood, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/971,034

(22) Filed: Nov. 14, 1997

(51) Int. Cl.[7] .................................................. H04M 1/656
(52) U.S. Cl. ..................................... 379/88.22; 379/88.14
(58) Field of Search ............................... 379/67.1, 88.01, 379/88.04, 88.12, 88.13, 88.14, 88.16, 88.18, 88.19, 88.2, 88.21, 88.22, 88.26, 100.08

(56) References Cited

U.S. PATENT DOCUMENTS

| | | |
|---|---|---|
| 5,249,217 | 9/1993 | Lee . |
| 5,544,231 * | 8/1996 | Cho .......................................... 379/67 |
| 5,557,659 * | 9/1996 | Hyde-Thomson ...................... 379/88 |
| 5,859,898 * | 1/1999 | Checco .............................. 379/88.01 |
| 5,870,454 * | 2/1999 | Dahlen .............................. 379/88.14 |
| 5,974,449 * | 10/1999 | Chang et al. ......................... 709/206 |

* cited by examiner

Primary Examiner—Scott L. Weaver

(57) ABSTRACT

An audio note taking system and method that permit a user to record audio information during a conversation on a wireless or wired communications device and distribute the information to other users in an efficient and accurate manner by working in concert with other types of communication and information devices, such as voice mail and electronic mail servers. The audio note taking system has a processor for controlling when an audio recording is to be commenced, which parties are to be recorded and what processing is to be performed on the recorded message. The notes recorded by one party are fully independent from the notes recorded by the other parties. As a consequence, each party can record private comments by muting transmission to the other parties involved in the call. The recorded message may be distributed to other parties as an audio or text file utilizing electronic mail and voice mail servers. Specifically, the device enables the user to direct the recorded information to a speech recognition processor, where the now converted text message can be forwarded to other parties as electronic mail. A communications device for use with the audio note taking system employs a user interface to permit recording, distributing and retrieving of audio messages in a hands free manner. The communication device further includes a detachable storage unit for recording the information and transferring the recorded information to another storage medium, such as a disk on a personal computer, for processing. The system permits user-directed retrieval of the audio information for playback on the communication device or other compatible communication devices.

46 Claims, 4 Drawing Sheets

AUDIO NOTE TAKING SYSTEM AND METHOD FOR COMMUNICATION DEVICES

FIELD OF THE INVENTION

The present invention relates generally to the field of communications, and more particularly to devices for recording audio notes in communications systems.

BACKGROUND OF THE INVENTION

Portable wireless communications devices have gained wide acceptance among the general public causing a dramatic increase in the number and types of wireless devices which are presently available. A common occurrence with these devices is that they are being used in non-traditional environments outside of the home or office which allow a user to take full advantage of the portable/wireless aspects of the device. Because of their use in such non-traditional environments, a user may lose the ability to take accurate notes while engaged in a conversation, since the user may simultaneously be engaged in another task, for example, driving an automobile.

In an effort to address such an inability to take accurate notes while engaged in a conversation on a wireless communications device (or any other communications device), devices described in prior art references have included the ability to make recordings at the device itself of ongoing conversations. These prior art references make no mention, however, of a manner in which a user can distribute the stored information to oneself or other parties once the information has been recorded. In particular, U.S. Pat. No. 5,249,217 issued to Lee discloses a wireless telephone which uses push buttons on a mobile unit to start and stop recording of speech of an opposite party by a base unit. However, the Lee patent does not provide a means for distributing the stored speech from the base unit.

SUMMARY OF THE INVENTION

The present invention is a system and method that permit a user to record audio information, i.e., audio notes, during a conversation on any telephonic communications device, e.g., wireless or wired devices, coupled to an appropriate network, and distribute the information to other parties in a number of different formats. Importantly, the present invention provides an interface with other communication systems, for example, voice servers, e-mail servers, and personal computers, in order to distribute the stored audio information in an accurate and comprehensive manner.

In an exemplary embodiment of the present invention, a communication system has a recording means and a distribution means for controlling when an audio recording is to be commenced, which parties on a call are to be recorded and what processing is to be performed on the recorded message. Advantageously, the notes recorded by one party on a call are fully independent from the notes recorded by the other parties. As a consequence, each party can record private comments by muting transmission to the other parties involved in the call. An exemplary embodiment of a communications device for use with the audio note taking system employs a user interface to permit recording, distributing and retrieving of audio messages in a hands free manner. The communication device may further include a detachable storage unit for recording the information and transferring the recorded information to another storage medium, such as a disk on a personal computer, for processing.

The present invention also allows users to replay previously recorded notes during the current call. Furthermore, the system permits user-directed retrieval of the audio information for playback on the communications device or other compatible communication devices. The system enables the user to direct the recorded information to a speech recognition processor, where the converted message can be forwarded to other parties as electronic mail.

DETAILED DESCRIPTION

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example the functions of processors presented in FIGS. 2–3 may be provided by a single shared processor. (Use of the term "processor" should not be construed to refer exclusively to hardware capable of executing software.)

Illustrative embodiments may comprise microprocessor and/or digital signal processor ("DSP") hardware, read-only memory ("ROM") for storing software performing the operations discussed below, and random access memory ("RAM") for storing results. Very large scale integration ("VLSI") hardware embodiments, as well as custom VLSI circuitry in combination with a general purpose DSP circuit, may also be provided.

Figure 1:
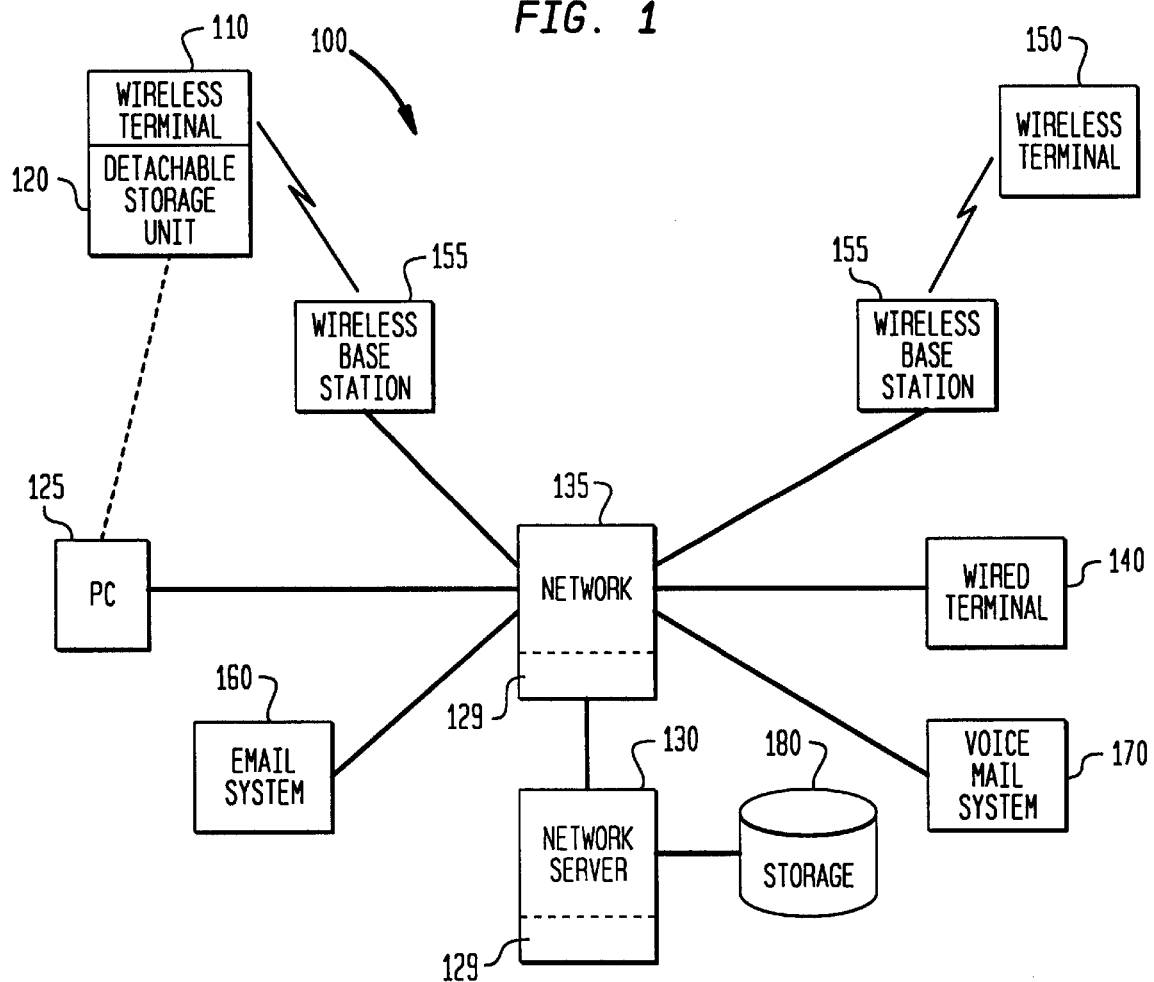
FIG. 1 is a block diagram of an illustrative embodiment of a communications system including a wireless terminal, a wired terminal and detachable storage unit in accordance with the present invention.

Referring to FIG. 1, there is shown a telecommunications network 100 through which parties communicate with one another utilizing various communications devices such as wireless terminal 110, wireless terminal 150 and wired terminal 140. Telecommunications network 100 further includes network components 135 which, as would be understood by a person skilled in the art, may be a collection of switches, routers, multiplexers/demultiplexers, transmission and other access equipment that provide for voice, video, data and other types of transmissions to be communicated across the network. These communication services are provided to attached terminals coupled to the network, such as wired terminal 140 and wireless base station 155. As illustrated, wireless base station 155 provides wireless connectivity to wireless terminal 110 and wireless terminal 150.

Telecommunications network 100 may also have various servers attached thereto to provide enhanced services, including an electronic mail system 160, a voice mail system 170 and other applications which may require a network or adjunct processor 130 and storage device 180. Telecommunications network 100 may be built, owned and/or operated by businesses for their private use, or by public network operators, including Local Exchange Carriers ("LEC"), Interexchange Carriers ("IXC"), wireless carriers, or a combination thereof. A destination user may be any party or device connected to telecommunications network 100.

In an exemplary embodiment of the present invention, an audio note taking mechanism 129 is implemented within network components 135 and/or an adjunct server 130 and is responsive to user input processing and control signal generation from wireless terminal 110 and/or wireless terminal 150. The processing implemented in network components 135 and/or an adjunct server 130 for audio note taking mechanism 129 involves performing the telecommunication and networking functions for all of the wired and wireless devices coupled to the network that can include voice stations, data terminals, trunks, electronic mail servers, and voice mail servers. This latter processing also includes intermediary processing functions, such as, control signal analysis and speech recognition processing.

In general, a user can take multiple audio notes of a specific conversation by starting and stopping a recording device included in audio note taking mechanism 129 by generating appropriate control signals from a respective communication device during that conversation. These multiple notes can then be concatenated to one another, if desired, to form a single audio note for storage purposes. The user can also make private notes before, during or after the conversation. Advantageously, the present invention enables a user's terminal to be muted while making private notes during a conversation so that other parties on a call cannot hear the user's private thoughts embodied in the audio note. Additionally, each party on the call having access to the present invention can make separate audio notes. The content of an audio note is specific to each user where the storage of the audio note is selectable by the user via a user interface mechanism (shown in FIGS. 4–6).

In addition to the note taking mechanism located in the network, the user may record and store audio notes on a detachable storage unit 120. As illustrated in FIG. 1, detachable storage unit 120 is attachable to wireless terminal 110 for recording the audio information. Detachable storage unit 120 is also useable with wired terminal 140. As explained below, the user can retrieve the stored information from detachable storage unit 120 for replay or transfer it to a computer 125 for further processing. Although computer 125 is connected to network components 135 in FIG. 1, detachable storage unit 120 is connectable to non-networked computers, for example, a laptop computer while on travel.

If the audio note is stored on detachable storage unit 120, the user then has the ability to upload this information to a personal computer or other such compatible device for further processing, such as, converting the audio file to a text file, applying word processing functions to the text file, and forwarding the audio or text file to other users via electronic mail systems or voice mail systems.

If the audio note is stored in network storage 180, then the user has additional options with respect to the processing or distribution of the stored audio note. For example, the user can retrieve the audio note via any telephone communications device for replay of the stored communication. As will be explained, the user can also convert and/or forward the audio note to other users via the user's e-mail or voice mail addresses. Alternatively, the user can upload the recorded notes from network server 130 onto a personal computer 125 for further processing, manipulation and/or forwarding. The above permits the user and/or other users to review and confirm conversations without delay.

Figure 2:
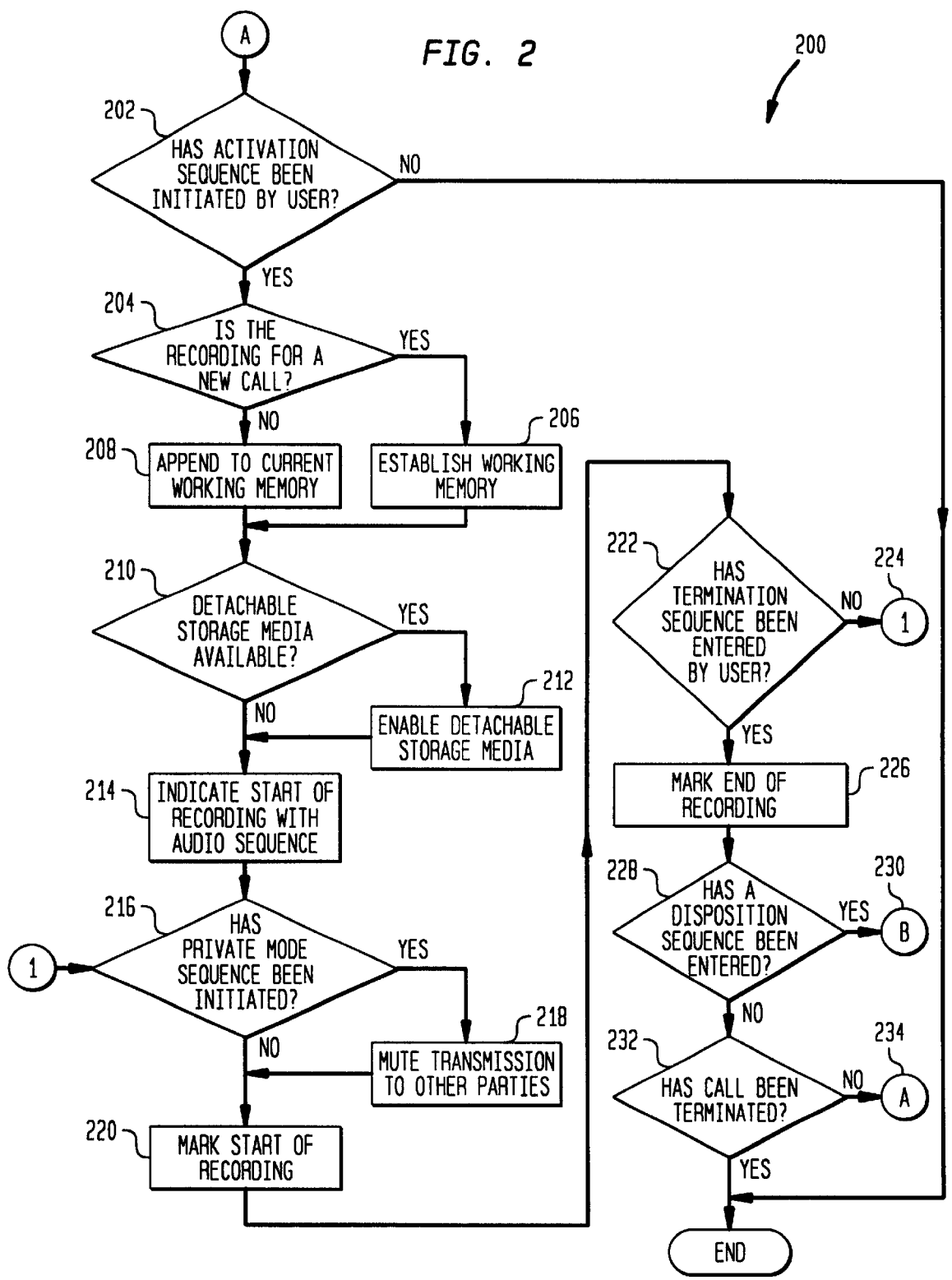
FIG. 2 is a functional flow diagram of an embodiment of the recording method of the present invention.
Figure 3:
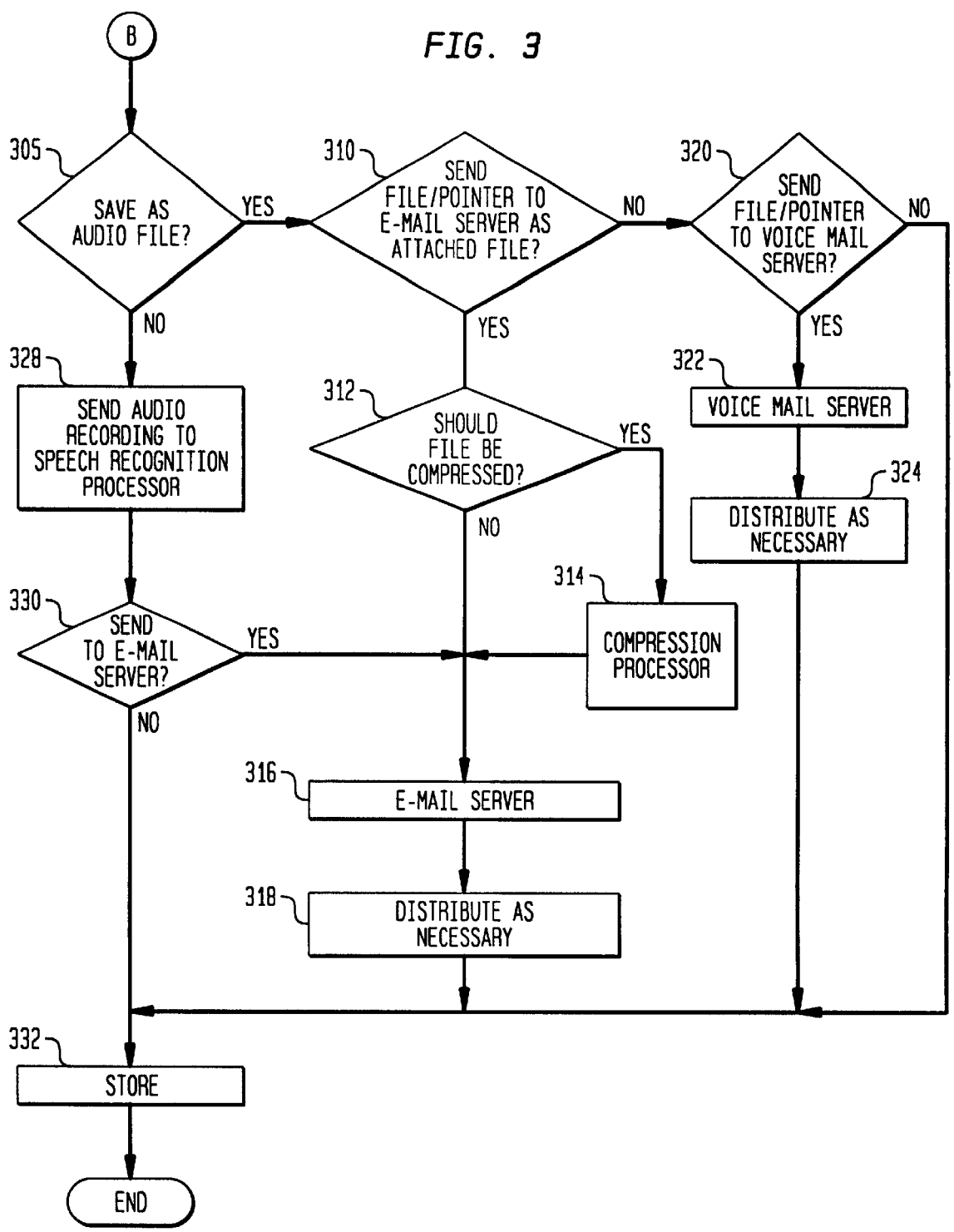
FIG. 3 is a functional flow diagram associated with the recording method shown in FIG. 2.

Referring now to FIGS. 2 and 3 and in conjunction with FIG. 1, a functional flow diagram for the recording methodology of the present invention is illustrated and is denoted generally as 200. Although the following description illustrates network component 135/adjunct server 130 based control, note taking control functionality is also able to be implemented directly within the communications devices. Once a call has been established between the user and a destination party or parties, to initiate the recording process (step 202), the user inputs an activation sequence (which may entail the depression of one or more keys on the communication device or voice activation). The audio note taking mechanism 129 then determines if the proper activation sequence has been entered, and if so, makes a determination as to whether audio notes have been previously recorded during this call (step 204). If no audio notes have been made within that time, then a temporary working memory is established for recording the audio note (step 206). Note that the working memory can be located anywhere in network components 135, wireless terminal 110, adjunct 130, associated storage 180 or even in detachable storage unit 120.

If a previous audio note has been made the new audio note is then appended in memory to the last audio note by audio note taking mechanism 129 (step 208). In this fashion, the user can make multiple audio notes during the call and concatenate all of the audio notes into a single audio note for further processing and distribution. Alternatively, the user can use a different command sequence to make independent notes that are not concatenated. This is useful when several topics are discussed during a call and the user wants to send only specific notes to specific parties. Moreover, each party on the call utilizing the present invention can take audio notes that are fully independent from all other parties taking audio notes on the call. Again, this allows each party on the call to process the audio notes on an individual basis.

The user can select, at the time of recording, whether the note will be stored on detachable storage unit 120 (if available), on the audio note taking mechanism 129 (or in network server 130 and storage 180 if applicable) or on both. If the option to use the detachable storage unit is selected, the present invention determines if a detachable storage unit 120 is attached to the communications device (step 210). If the audio note taking mechanism 129 determines that a detachable storage unit 120 is present and that the user wants a copy of the audio note on detachable storage unit 120, then an enabling signal is sent, to the communications device so that detachable storage unit 120, along with audio note taking mechanism 129, can record the audio note (step 212). This arrangement prevents loss of information if detachable storage unit 120 is full. That is, audio note taking mechanism 129 of the network is able to handle recording overflow, if it occurs, in detachable storage unit 120.

At this juncture and depending upon the legal requirements, an appropriate audio sequence can be injected into the call to indicate to all users on the call that an audio note is being taken of the call (step 214). Prior to starting the recording, the audio note taking mechanism 129 will verify if the user has enabled a private mode function (step 216). If this mode has been activated, then transmission to other parties on the call is muted, however, note recording on the call is still active (step 218). This functionality permits the user to make private comments regarding the call which the user does not want the other parties to hear. As such, the present invention permits the intermingling of comments with the actual conversation to create an annotated recorded message. To ease subsequent processing of the stored audio note, the beginning of the actual recording period is marked by audio note taking mechanism 129 to permit retrieval by the user. This may be implemented using a time stamp, date stamp or any other similar convention (step 220).

During the recording period, audio note taking mechanism 129 will continually check whether a termination sequence (or stop button) has been entered (step 222). If the termination sequence has not been entered by the user, then audio note taking mechanism 129 maintains a check to determine whether the user wants to make a private note (step 224). The above two steps are repeated until a termination event has occurred.

There are essentially two types of termination events, initiated and noninitiated. The non-initiated termination event occurs when the call terminates, is cut-off due to line problems, range problems or other similar situations. In this type of termination, audio note taking mechanism 129 marks the end of the recording and saves the audio note for later retrieval by the user. This type of termination event can occur at any time during the recording or the call. The stored information can be identified with the user's access number or other similar unique identification technique. The initiated termination event, as the name implies, is actuated by the user by a termination sequence.

If the termination sequence has been entered, then the audio note taking mechanism 129 marks the end of the recording in the same manner as it marked the beginning of the recording (step 226). The audio note taking mechanism 129 then determines if the user has entered a distribution command sequence to initiate processing of the audio note (step 228). If a distribution sequence has not been entered by the user, then audio note taking mechanism 129 verifies whether the call has been terminated (step 232). If the call has not been terminated, then audio note taking mechanism 129 checks if the user has initiated another audio note recording (step 234). If the call has been terminated and the user has not entered a distribution sequence, audio note taking mechanism 129 stores the audio note with an identification code.

If a distribution code or sequence has been entered (step 230), then audio note taking mechanism 129 of the network determines what type of further processing is required based on the codes entered. Referring now to FIG. 3, audio note taking mechanism 129 determines if the audio note is to be processed as an audio file or as a text file (step 305). If the audio note is processed as an audio file, audio note taking mechanism 129 then determines whether the user has selected to forward the message via an electronic mail server or a voice mail server (step 310). In both instances, audio note taking mechanism 129 can either forward the actual file as an attachment or a pointer indicating the location of the file. If forwarding is accomplished using the e-mail server, audio note taking mechanism 129 determines if the file should be compressed prior to distribution (step 312). If compression is required, audio note taking mechanism 129 then utilizes standard compression techniques to reduce the size of the data (step 314). The compressed or uncompressed file/pointer is then sent to the e-mail server for distribution to the selected destinations (steps 316 and 318). The distributed file can be received by any compatible device, for example, a personal computer, corporate e-mail, etc. The user can identify members on the distribution list using the key pad to type the name or by verbally listing the names. If the forwarding is accomplished using a voice mail server (step 320), then the audio file or pointer is forwarded to the voice mail server (step 322), which then distributes the file/pointer to the selected party or parties (step 324). In both instances, the user can supply additional instructions to the receiving party or parties, for example, reply required, return comments, etc. In each of the above scenarios, audio note taking mechanism 129 stores the audio file locally, or in adjunct server 130 and storage 180 (step 332). If no additional processing of the audio file is necessary, then audio note taking mechanism 129 simply stores the audio note (step 332).

If the audio note is to be saved as a text file, as directed by the user, then the audio note is sent to a speech recognition processor for conversion from an audio file to a text file (step 328). The utilization of a speech recognition processor to convert speech to text is well known to those skilled in the art and therefore need not be described in greater detail. Audio note taking mechanism 129 then determines if the text file is to be forwarded to the other party or parties via an e-mail server (step 330). Note that the text file can also be sent as a facsimile utilizing, for example, the facsimile functions available in many e-mail servers. This permits distribution to parties having access only to facsimile machines. If no distribution is necessary, then the text file is stored as described above (step 332).

Once the audio note(s) has been stored, the user has various options for retrieving the stored information and then distributing the stored information to selected parties. Since audio note taking mechanism 129 stores the audio note(s), the user can selectively access the audio note(s) from any communications device, either wired or wireless. After establishing a communications link with audio note taking mechanism 129, the user can select a specific audio note from a group of audio notes using an identification code, similar to message retrieval on a voice mail server. The user can then process and distribute the retrieved audio note in a similar manner as shown in FIG. 3 and utilize similar types of controls as described for recording of the audio note. The user can also retrieve and replay notes taken previously on other calls or during the current call. The latter is achieved by placing the called party on hold, and then having the user access and replay the previously stored note. This allows the user to accurately replay the notes during the call if required. Alternatively, the user can access the recordings stored on network components 135 via application software on computer 125. The user can then utilize the application software to forward notes to other parties, convert the recordings to text via a speech-to-text processor, upload the data to computer 125 and perform other intermediate processing/distribution functions.

If the audio notes have been recorded onto detachable storage unit 120, the user can then replay the audio note using the communications device, or other compatible playback devices. Furthermore, the user can attach detachable storage unit 120 to a personal computer or workstation and upload the information for further processing of the audio note. In particular, the user can process the audio note in the same manner as shown in FIG. 3.

Figure 4:
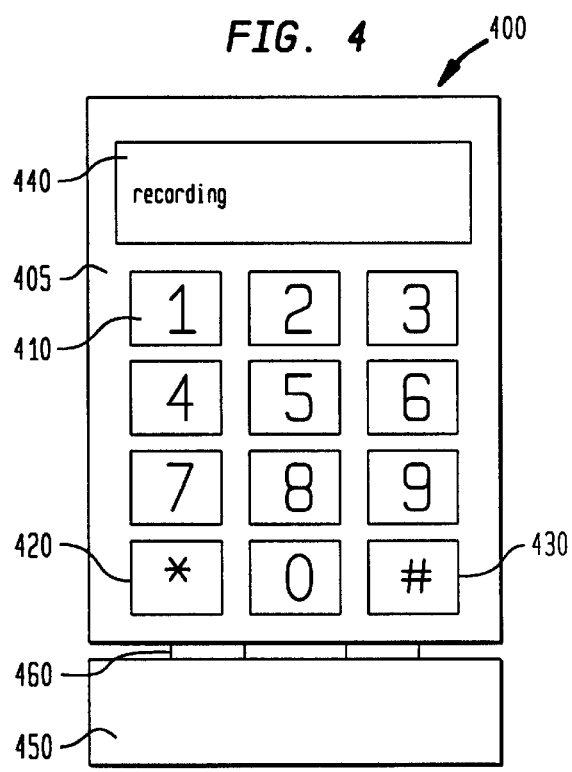
FIG. 4 illustrates an embodiment of a user interface in accordance with the present invention.

In an exemplary embodiment of the present invention, the communications device used in connection with the present invention utilizes key pads and/or voice activation techniques as a user activation and control mechanism for the recording, retrieving and distributing of the audio information. Referring to FIG. 4, a communication device 400 is shown which includes an embodiment of such a user activation mechanism. As illustrated, communications device 400 utilizes a key pad 405 for the various functions. Specific combinations of numbers 410, star sign symbol 420 ("*") and pound sign symbol 430 ("#") on conventional telephone key pad 405 correspond to start and stop recording signals. For example, the sequence "#56" indicates start audio recording and the sequence "#57" indicates stop audio recording. As detailed below, activation/deactivation of private mode recording would be similarly implemented. Specific sequences are reserved for specialized processing commands, such as, forwarding, data compression and speech to text conversion. Other sequences are used by the user for controlling retrieval of the audio information, for example, fast forward, skipping specific notes (similar to a music search), reverse and changing playback speeds. Based on the user input, the communications device generates and transmits various Dual Tone Multi Frequency ("DTMF") signals to the core processing mechanism, for example, network components 135. The core processing apparatus analyzes and performs the user requested functions. A display area 440 indicates the status of the recording process.

Referring still to FIG. 4, communications device 400 further includes an optional detachable storage unit 450 for recording and playing back the user's audio notes. Detachable storage unit 450 is electrically coupled to communications device 400 using, for example, a socket interface 460, a cable or other similar techniques. As explained below, detachable storage unit 450 can then be electrically coupled to a user's computer for uploading the stored audio note into a file. The audio information can be stored in any suitable format, i.e., digital or analog, and in any suitable medium, i.e., tape.

In another embodiment of the user interface, voice activation and control techniques are employed to provide hands free operation of the audio note taking function. In this instance, the user verbalizes key phrases or words which are recognized and utilized by a speech recognition processor to control the recording process directly. The speech recognition processor is implementable as part of audio note taking mechanism 129 in network components 135 or adjunct processor 130. As such, the speech recognition processor supplies the control signals to the recording unit in lieu of control signals sent directly by the user terminal. This permits full functionality of a standard communications device without the necessity of additional capabilities or keys, etc. An example of words or phrases that could be used are "start recording", "stop recording", "forward to e-mail" and other such similar command sequences. Alternatively, the key words or phrases could be verbalizations of the number sequences shown above. For example, the user could say "pound fifty six" to initiate recording.

Figure 5:
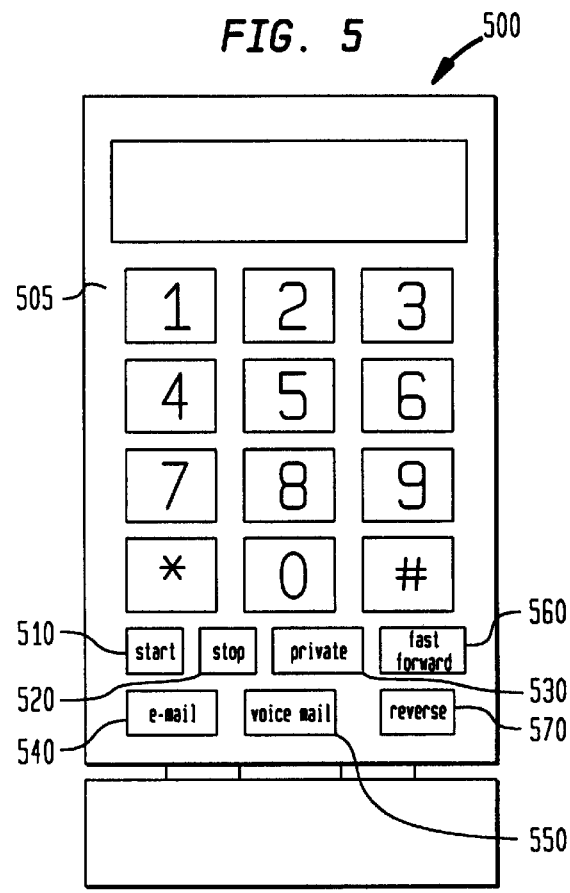
FIG. 5 illustrates another embodiment of a user interface utilizing specialized keys in accordance with the present invention.
Figure 6:
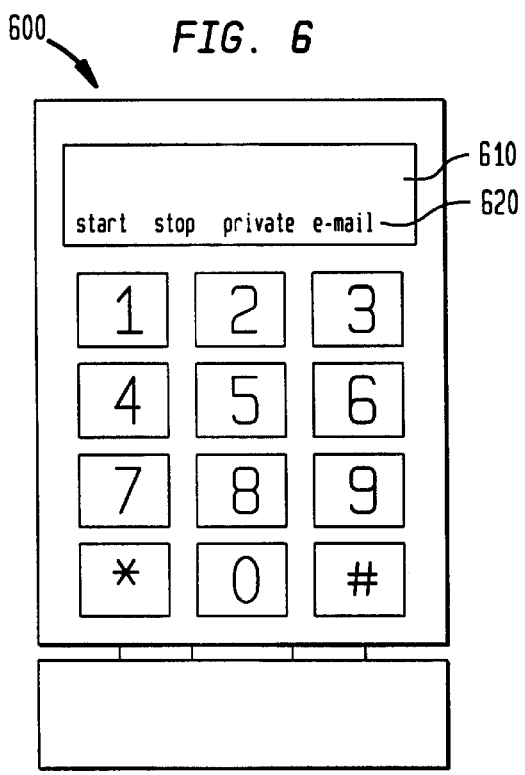
FIG. 6 illustrates an embodiment of a user interface utilizing softkeys in accordance with the present invention.

Referring now to FIG. 5, another embodiment of a communications device 500 is shown which utilizes customized buttons situated on a key pad 505. Key pad 505 includes a start button 510, a stop button 520, and a private mode button 530 for activation/deactivation of the audio recording function. Note that the processing buttons include forward to e-mail 540, forward to voice mail 550 and other such functions. Retrieval functions include fast forward 560, reverse 570 and other similar functions. As would be understood, the above represents an example set of functions and does not exclude other types of processing. Although FIG. 5 illustrates one key—one function operation, multiple function keys could be utilized to achieve the same results. Alternatively, as shown in FIG. 6, software driven keys 620 ("softkeys") could also be utilized in a display area 610 of a communications device 600. As would be understood, the communications device of the present invention could also be a combination of the techniques described above.

The above description presents an system and method that permit users to record audio information during a conversation on a wireless or wired communication device. The present invention permits utilization of other types of communication and information devices, such as voice mail and electronic mail services, to retrieve and distribute the information to other interested parties in an efficient and accurate manner. On a functional level, the present invention includes a recording processor, distribution processor and retrieval processor. These processors are implementable in an adjunct processor or server connected to an existing telecommunications system. It is applicable to all telecommunication systems providing voice telephony services - wired or wireless, analog or digital.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed is:

1. A communication system, comprising:
   a processor operable in response to a signal from a user to enable a recording of at least one message during a call over the communication system between said user and at least one other party;
   a muting control operative to restrict access to said recorded message by other parties to the call than said user; and
   wherein said processor and said muting control cooperatively effect a private recording of said message by said user while corrected in a call with said at least one other party.

2. The system according to claim 1, further wherein said processor and said muting control cooperatively enable a recording of intermingled conversation of parties to the call and private comments of said user.

3. The system according to claim 2, wherein said processor is operable to concatenate multiple messages taken during said call to form said at least one message.

4. The system according to claim 1, wherein said processor is operable to place an identification code on said at least one message.

5. The system according to claim 1 further including a means for distributing said at least one message over the communication system in response to a distribution signal.

6. The system according to claim 5, said distribution processor further including:
   a speech to text recognition device for converting said at least message to a text file;
   said means for distributing being operable to distribute said text file via at least one service selected from the group consisting of electronic mail service and facsimile service.

7. The system according to claim 5, wherein said means for distributing includes a means for retrieving a stored message in response to a retrieval signal.

8. The system according to claim 7, wherein said means for retrieving permits retrieval and play of said stored message during said call.

9. The system according to claim 5, wherein said means for distributing includes:
   means for selecting at least one recorded message for distribution from among a plurality of recorded messages;

means for selecting at least one party for distribution;

means for indicating a type of distribution service to be used for delivery of said at least one recorded message; and means for indicating what format is to be utilized for said at least one recorded message.

10. The system according to claim 1, wherein said processor is operable to place an identification code on said at least one message.

11. The system according to claim 10, wherein:

said processor and said muting control cooperatively enable a recording of intermingled conversation of parties to the call and private comments of said user; and said processor is operable to concatenate multiple messages taken during said call to form said at least one message.

12. A communications device comprising:

a user interface comprising a means for generating a record signal and a private mode signal during a call in which said communications device is connected with at least one other party via a communications system, whereby said record signal and said private mode signal cooperate to direct a recording of a private note during said call; and transmitting means operative to transmit said record signal over the communications system.

13. The device according to claim 12, wherein said user interface includes interface controls which are selected from the group consisting of function keys and voice activation.

14. The device according to claim 13, wherein said interface controls include a start recording function, a stop recording function, a private mode function, a fast forward function, a reverse function, a forward to e-mail function, a forward to voice mail function, and a playback speed control function.

15. The device according to claim 14, wherein said private mode function transmits a mute signal for muting transmission to other parties on said call and for intermingling conversation of a party using said device with private comments to form said note, said private comments being unavailable to other parties on said call.

16. The device according to claim 14, wherein said user interface includes a display area adapted to indicate status of recording, distribution and retrieval functions.

17. The device according to claim 12, further comprising:

a socket interface; and a detachable storage unit removably coupled to said socket interface for the recording of at least one note.

18. The device according to claim 17, wherein said detachable storage unit is connectable to other compatible communication devices.

19. The device according to claim 18, wherein said detachable storage unit facilitates uploading of said at least one recorded note to a secondary communications device for retrieving, and replaying said recorded note.

20. The device according to claim 12, wherein said user interface further includes:

means for selecting at least one note for distribution from among a plurality of notes;

means for selecting at least one party for distribution of said at least one note for distribution;

means for indicating type of distribution service to be used for delivery of said at least one note for distribution; and means for indicating what format is to be utilized for said at least one note for distribution.

21. In a communications network, a method comprising the steps of:

recording at least one note during a call between users communicating over the communication network; and muting transmission to other users in a private mode;

wherein said recording and said muting steps are initiated in response to a user signal, thereby permitting a user to make private comments regarding said call by muting transmission to other users on said call.

22. The method according to claim 21, wherein said step of recording includes the steps of:

starting recordation of said at least one note in response to an enable signal;

stopping recordation of said at least one note in response to a disable signal; and repeating said starting, said stopping and said muting steps to permit multiple note recordings to be made and concatenated into said at least one note.

23. The method according to claim 22, wherein said step of recording includes the steps of:

marking a start and stop event of said at least one note in response to start and stop signals; and marking said at least one note with an identification code in response to said stop signal.

24. The method according to claim 21, comprising the further step of distributing said at least one recorded note over said communications network in response to a distribution signal, wherein said step of distributing includes the substeps of:

formatting said at least one note in response to said distribution signal;

identifying parties to distribute a formatted note in response to said distribution signal; and utilizing a given distribution service in response to said distribution signal.

25. The method according to claim 24, wherein said step of formatting includes sending said at least one note to a speech recognition processor for converting said at least one note to a text file in response to a text file distribution signal.

26. The method according to claim 24, wherein said distribution service is at least one service selected from the group consisting of electronic mail service and voice mail service.

27. The method according to claim 21, further including the step of retrieving a stored note in response to a retrieval signal.

28. The method according to claim 27, wherein said step of retrieving permits retrieval and play of said stored note during an on-going call with other users.

29. The method according to claim 24, wherein said step of distributing further includes the steps of:

selecting at least one recorded note for distribution from among a plurality of recorded notes in response to said distribution signal;

selecting at least one party for distribution of said at least one recorded note in response to said distribution signal;

indicating a type of distribution service to be used for delivery of said at least one recorded note in response to said distribution signal; and indicating what format is to be utilized for said at least one recorded note in response to said distribution signal.

30. The method according to claim 21, wherein said step of recording includes the steps of:

locally saving said at least one note;

checking if a detachable storage unit is available in response to a remote recording signal; and remotely saving said at least one note to said detachable storage unit if said detachable storage unit is present.

31. The method according to claim 21, further including the steps of transmitting a recording, distributing and retrieving status.

32. A communications device comprising:

a user interface processor operable to manage a user interface for said device and to generate a record signal, a private mode signal and a distribution signal in response to user input, whereby said record signal and said private mode signal cooperate to direct a recording of a private note during a call in which said communications device is connected with at least one other party in a communication system;

a storage medium for storing said private note during said call; and a distribution infrastructure for distributing stored ones of said private notes to said communication system in response to a distribution signal.

33. The device according to claim 32, wherein said user interface includes interface controls which are selected from the group consisting of function keys and voice activation.

34. The device according to claim 32, wherein said user interface includes a start recording function, a stop recording function, a private mode function, a fast forward function, a reverse function, a forward to e-mail function, a forward to voice mail function, and a playback speed control function.

35. The device according to claim 34, wherein said private mode function transmits a mute signal for muting transmission to other parties on said call and for intermingling conversation of users with private comments to form said private note, said private comments being unavailable to other parties on said call.

36. The device according to claim 32, wherein said user interface includes a display area adapted to indicate status of recording, distribution and retrieval functions.

37. The device according to claim 32, wherein said storage medium further includes a detachable storage unit removably coupled to a socket interface.

38. The device according to claim 37, wherein said detachable storage unit is connectable to other compatible communication devices.

39. The device according to claim 38, wherein said detachable storage unit facilitates uploading of said recorded note and said stored note to a secondary communications device for retrieving, and replaying said stored note.

40. The device according to claim 32, wherein said user interface further includes:

means for selecting at least one note for distribution from among a plurality of notes;

means for selecting at least one party for distribution of said at least one note for distribution;

means for indicating type of distribution service to be used for delivery of said at least one note for distribution; and means for indicating what format is to be utilized for said at least one note for distribution.

41. A communication system, comprising:

a processor for recording at least one message during a call over the communication system in response to a record signal; and means for distributing said at least one message over the communication system in response to a distribution signal;

wherein said processor is operable to intermingle conversation of users with private comments in response to a private node signal, said private comments being unavailable to other parties on said call.

42. A communications device comprising:

a user interface comprising a means for generating a record signal during a call via a communications system;

a socket interface;

a detachable storage unit removably coupled to said socket interface for the recording of at least one note; and transmitting means operative to transmit said record signal over the communication system.

43. The communications device of claim 42 wherein said user interface further comprises a means for generating a distribution signal, said distribution signal being operative to direct stored ones of said at least one recorded note to points in the communication system, and further wherein said transmitting means is operative to transmit said distribution signal over the communication system.

44. The communications device of claim 12 wherein said user interface further comprises a means for generating a distribution signal, said distribution signal being operative to direct ones of said recorded private notes to points in the communication system, and further wherein said transmitting means is operative to transmit said distribution signal over the communication system.

45. A communications device comprising:

a user interface processor operable to generate a record signal and a distribution signal;

a storage medium for storing an audio note during a call in a communication system in response to said record signal; and a distribution infrastructure for distributing a stored audio note to said communication system in response to a distribution signal;

wherein said user interface includes a start recording function, a stop recording function, a private mode function, a fast forward function, a reverse function, a forward to e-mail function, a forward to voice mail function, and a playback speed control function.

46. The device according to claim 44, wherein said private mode function transmits a mute signal for muting transmission to other parties on said call and for intermingling conversation of users with private comments to form said audio note, said private comments being unavailable to other parties on said call.

* * * * *